United States Patent
Borg (10) Patent No.: US 8,189,243 B1
(45) Date of Patent: May 29, 2012

(54) COLOR CALIBRATION FOR DIGITAL IMAGING DEVICES

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1232 days.

(21) Appl. No.: 11/939,014

(22) Filed: Nov. 13, 2007

(51) Int. Cl.
*G03F 3/08* (2006.01)

(52) U.S. Cl. ........ 358/518; 358/504; 358/1.9; 358/3.23; 358/520; 358/521; 382/112; 382/162; 382/167

(58) Field of Classification Search .......... 358/1.9, 358/518, 504, 3.23, 520, 521, 523; 382/112, 382/162–167
See application file for complete search history.

(56) References Cited

U.S. PATENT DOCUMENTS

| | | | |
|---|---|---|---|
| 6,178,254 B1 * | 1/2001 | Rappette et al. | 382/112 |
| 7,027,187 B1 * | 4/2006 | Zuber | 358/1.9 |
| 2004/0021784 A1 * | 2/2004 | Vaughn | 348/254 |
| 2004/0196475 A1 * | 10/2004 | Zeng et al. | 358/1.9 |
| 2006/0280360 A1 * | 12/2006 | Holub | 382/162 |

OTHER PUBLICATIONS

"Graphic technology and photography—Colour characterization of digital still cameras (DSCs)—Part 2: Methods for determining transforms from raw DSC to scene-referred image data" ISO, 19 pgs., Oct. 10, 2003.

"Graphic technology and photography—Colour characterization of digital still cameras (DSCs)—Part 1: Stimuli, metrology, and test procedures" ISO TC 42N, 39 pgs., Jul. 20, 2005.

"Color Image Acquisition—19.7 A worked example of 3×3 color correction matrix" Cambridge University, pp. 515-521.

* cited by examiner

*Primary Examiner* — Mark K Zimmerman
*Assistant Examiner* — Martin Mushambo
(74) *Attorney, Agent, or Firm* — Robet C. Kowert; Meyertons, Hood, Kivlin, Kowert & Goetzel, P.C.

(57) ABSTRACT

The subject matter disclosed herein relates to color calibration for digital imaging devices. Color correction may be performed for digital imaging devices. A response of a device to known colors may be obtained. The response may be obtained at least in part through an image that may include one or more color patches. One or more linearization curves may be determined by fitting values from one or more color patches within the image to reference data. In addition, a color correction matrix may be determined by estimating local minimum values utilizing one or more pairs of high-chroma color patches within the image.

24 Claims, 4 Drawing Sheets

COLOR CALIBRATION FOR DIGITAL IMAGING DEVICES

BACKGROUND

Many devices represent colors of image elements to users for a variety of purposes. These purposes may typically include representing colors of image elements by a device on a display and/or in print. When a given device represents colors to a user, the device typically employs a color space to define each displayed and/or printed color numerically. The color space of a given device defines the total range of colors reproducible by that device. Typically, the color space of a given device does not encompass all possible colors and is therefore only a subset of all possible colors. As the color space of a given device is typically only a subset of all possible colors, different types of devices, different device models, and/or different manufactures may use varying color spaces.

A given color may be specified or represented in the form of one or more color components, which may be thought of as dimensions in a color space. Each color component may have a numerical color component value and together the color component values may provide information to generate a desired color on an output device. A color space may define the interpretation of the color component values used to represent a color. Examples of color spaces are RGB (Red, Green and Blue) and CMYK (Cyan, Magenta, Yellow and Black). For many color spaces, a color may be represented by one to four numbers, one for each dimension or component of the color space.

Different devices often use different color spaces to represent colors, often resulting in the conversion of colors between different color spaces. It may be challenging to accurately represent each displayed and/or printed color numerically as color data in the device color space, so that the colors appear accurate to the eye of a user. For example, the transfer of color data from one device color space to another device color space may result in inaccurate color representation if the color spaces of the two devices are not the same.

Color management often may be used to facilitate the transfer of color data from one device color space to another different device color space. Color management may typically be performed via a color management system (CMS), which may be used to reduce or eliminate color space matching problems and makes color portable. A CMS may reconcile the different color capabilities of cameras, scanners, monitors, and/or printers to ensure consistent color throughout the transfer of color data between various devices. For example, the colors displayed on a monitor may be accurately transferred to a printer. Similarly, color management may permit different applications, devices, and/or operating systems to display colors consistently.

A frequently used method in color management for converting color component values from a source color space to a device independent color space may include the use of a color correction matrix. The color correction matrix may contain a set of correction values that may be used to transform input device dependent color data as expressed in a source color space into device independent color data as expressed in a device independent color space. For example, if the source color space is RGB (Red, Green, and Blue) and the device independent color space is CIE XYZ (International Commission on Illumination XYZ), a CIE XYZ output color value corresponding to an RGB input color value may be obtained at least in part by transforming the RGB input color value by a color correction matrix.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, transforming, enabling, inhibiting, identifying, initiating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As will be described in greater detail below, in one particular example, although claimed subject matter is not limited in this respect, a color correction matrix may be determined for a digital imaging device. The term "digital imaging device" as referred to herein may mean a camera, scanner, and/or the like, although the scope of claimed subject matter is not limited in this respect. The color characteristics of such a digital imaging device may be determined by using the digital imaging device to take a picture of a test patch card having an array of colored patches of known colors. Based on the captured image, a correlation may be made between the known color values and the color values of the captured image.

Based the correlation between the known color values and the color values of the captured image, a color correction matrix may be determined. Such a color correction matrix may be determined so as to reduce the errors produced converting one or more channels of input color values expressed in a device dependent color space into one or more channels of output color values expressed in a device independent color space. More particularly, such a color correction matrix may be estimated by first fitting an initial color correction matrix based on high-chroma color patches found in the captured image taken by a digital imaging device. The term "high-chroma color patches" as referred to herein may mean a subset of non-grayscale-type color patches that have high color saturation and/or a high C (Chroma) value in an LCH (Luminance Hue Chroma) color space. An updated color correction matrix may then be calculated based at least in part all non-neutral color patches of the captured image to fine tune the initial color correction matrix, so as to avoid incorrect local minima error values. Thus, the resultant updated color correction matrix may be determined based on a robust stepwise fitting that avoids accidental error propagation that could otherwise result from a one step fitting.

Figure 1:
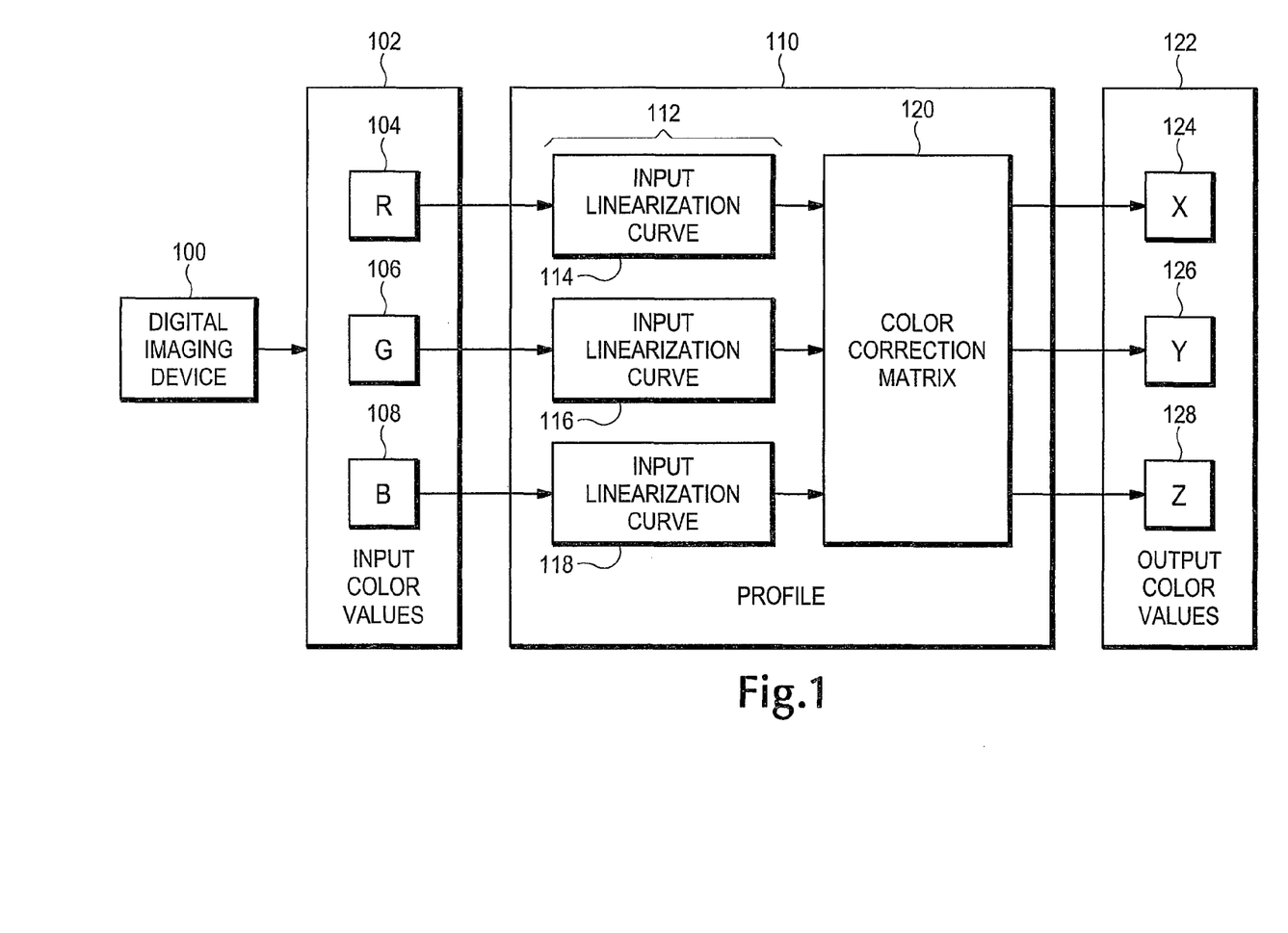
FIG. 1 is a schematic diagram illustrating a translation of data from input color values to output color values.

Referring to FIG. 1, a schematic diagram illustrates a translation of data from input color values to output color values in accordance with one or more embodiments. The terms "input color values" and/or "output color values" as referred to herein relate to information that is organized and/or formatted in a digitized form for printing or for displaying in a graphical user interface. For example, "input color values" and/or "output color values" may be organized and/or formatted in a digitized form comprising one or more of the following formats: jpeg, tiff, pdf, psd, and/or the like, or combinations thereof. However, these are merely example formats, and the scope of claimed subject matter is not limited in this respect.

Digital imaging device 100 may be utilized to obtain input color values 102 from an image obtained by digital imaging device 100. Input color values 102 may include input color values for multiple color channels. For example, if the input color values 102 are expressed in RGB (Red, Green, and Blue) source color space, the input color values 102 may include an R-channel 104, a G-channel 106, and a B-channel 108. Alternatively, other examples of color channels for the input color values 102 may include L*a*b* (luminance, red/blue chrominance and yellow/blue chrominance), CMYK (Cyan, Magenta, Yellow and Black), and/or the like.

The term "color managed" as referred to herein relates to the management of the transfer of input color values 102 from a source color space to a destination color space in a color conversion process. For example, the color space of a given device 100 may define a total range of colors reproducible by that device. Typically, the color space of a given device 100 does not encompass all possible colors and is therefore only a subset of all possible colors. As the color space of a given device 100 is typically only a subset of all possible colors, different types of devices (such as cameras, scanners, printers, displays, or the like), different device models, and/or different manufactures may use varying color spaces. For example, color management may translate input color values 102 from a source color space to a different destination color space. Color spaces may include but are not limited to the following: sRGB, Adobe RGB and Adobe Wide Gamut RGB, CMYK, CIE 1931 XYZ, CIELUV, CIELAB, CIE 1964, or the like. A device independent color space may provide an intermediate color space for transferring input color values 102 from a source device profile to a different destination device profile.

Device profile 110 may define the color characteristics of a given device 100 to allow for a translation of input color values 102 from a device dependent color space into a device independent color space. Alternatively, it is not required to convert input color values 102 to and from an intermediate color space. For example, a translation between a source device color space into a destination device color space may instead be accomplished by combining the transforms into one. However, these are merely examples of translations between color spaces, and the scope of claimed subject matter is not limited in this respect.

Input linearization curves 112 may be included in device profile 110 for use in a color conversion. Individual input linearization curves 112 may be assigned to one or more of the channels for input color values 104, 106, and/or 108. For example, if the input color values 102 are expressed in RGB source color space (as illustrated), the input linearization curves 112 may include an R-channel input shaper curve 114, a G-channel input shaper curve 116, and a B-channel input shaper curve 118. Alternatively, if the source color space is L*a*b* (luminance, red/blue chrominance and yellow/blue chrominance) the input color values 102 may include an L-channel input shaper curve, an a-channel input shaper curve, and/or a b-channel input shaper curve. Input color values 102 may be applied to input linearization curves 112 prior to color correction matrix 120. Input linearization curves 112 may operate to linearize generally non-linear device characteristics such as luminance, dot gain, and/or the like.

Color correction matrix 120 may be included in device profile 110 for use in a color conversion. The term "matrix" as used herein may comprise a format for arranging and/or organizing data, such as for example, a multi-dimensional table, a multi-dimensional matrix, a multi-dimensional array, and/or the like. The term "color correction matrix" as referred to herein relates to an array including a set of correction values that may be used to transform input color values as expressed in a source color space into output color values as expressed in an intermediate or destination color space. For example, a RGB-CIE XYZ conversion may include a color correction matrix 120 that may include a set of correction values in a 3×3 table entry format, with each table entry corresponding to a single correction value. For example, if the source color space is RGB (Red, Green, and Blue) and the intermediate color space is CIE XYZ (International Commission on Illumination XYZ), a CIE XYZ output color value 122 corresponding to an RGB input color value may be obtained at least in part by transforming the RGB input color value by color correction matrix 120.

Output color values 122 may include output color values for multiple color channels. For example, if the output color values 122 are expressed in an intermediate device independent CIE XYZ (International Commission on Illumination XYZ) color space, output color values 122 may include an X-channel 124, a Y-channel 126, and a Z-channel 128. Alternatively, other examples of color channels for the output color values 122 may include other intermediate device independent color spaces, and/or device dependent destination color spaces such as L*a*b* (luminance, red/blue chrominance and yellow/blue chrominance), CMYK (Cyan, Magenta, Yellow and Black), and/or the like.

Figure 2:
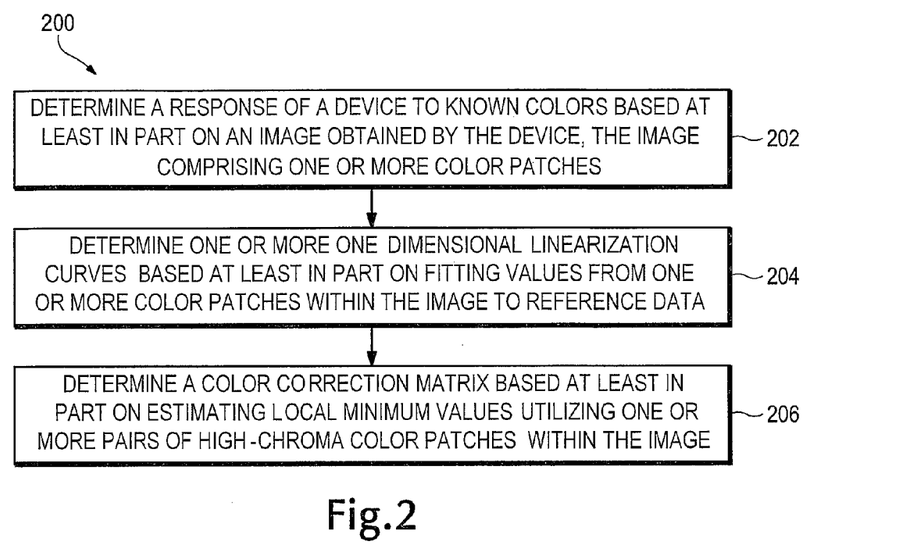
FIG. 2 is a flow diagram illustrating a procedure for determining a color correction matrix in accordance with one or more embodiments.

Referring to FIG. 2, a flow diagram illustrates an example procedure in accordance with one or more embodiments, although the scope of claimed subject matter is not limited in this respect. Procedure 200 illustrated in FIG. 2 may be used to determine a color correction matrix in accordance with one or more embodiments, for example, although the scope of claimed subject matter is not limited in this respect. Additionally, although procedure 200, as shown in FIG. 2, comprises one particular order of blocks, the order in which the blocks are presented does not necessarily limit claimed subject matter to any particular order. Likewise, intervening blocks shown in FIG. 2 and/or additional blocks not shown in FIG. 2 may be employed and/or blocks shown in FIG. 2 may be eliminated, without departing from the scope of claimed subject matter.

Procedure 200 depicted in FIG. 2 may in alternative embodiments be implemented in software, hardware, and/or firmware, and may comprise discrete operations. As illustrated, procedure 200 starts at block 202 where a response of a device to known colors may be determined. For example, such a device response may be determined based at least in part on an image obtained by the device, where the image may comprise one or more color patches. As discussed above, such a device may comprise a digital imaging device 100. The term "digital imaging device" as referred to herein may mean a camera, scanner, and/or the like, although the scope of claimed subject matter is not limited in this respect. Further, the known colors may comprise an array of colored squares of a test patch card. For example, the one or more color patches within the image may comprise one or more neutral color patches, one or more non-neutral color patches, and two or more high-chroma color patches. The term "neutral color patches" as referred to herein may mean grayscale-type color patches composed of shades of gray, varying from black at the weakest intensity to white at the strongest intensity. The term "non-neutral color patches" as referred to herein may mean non-grayscale-type color patches, such as for example, red color patches, green color patches, blue color patches, cyan color patches, yellow color patches, magenta color patches, and/or the like. The term "high-chroma color patches" as referred to herein may mean a subset of non-grayscale-type color patches that have high color saturation and/or a high C (Chroma) value in an LCH (Luminance Hue Chroma) color space.

At block 204, one or more one dimensional linearization curves may be determined. For example, such a one dimensional linearization curve may be determined based at least in part on fitting values from one or more color patches within the image to reference data. At block 206, a color correction matrix may be determined. For example, such a color correction matrix may be determined based at least in part on estimating local minimum values utilizing one or more pairs of high-chroma color patches within the image.

Figure 3:
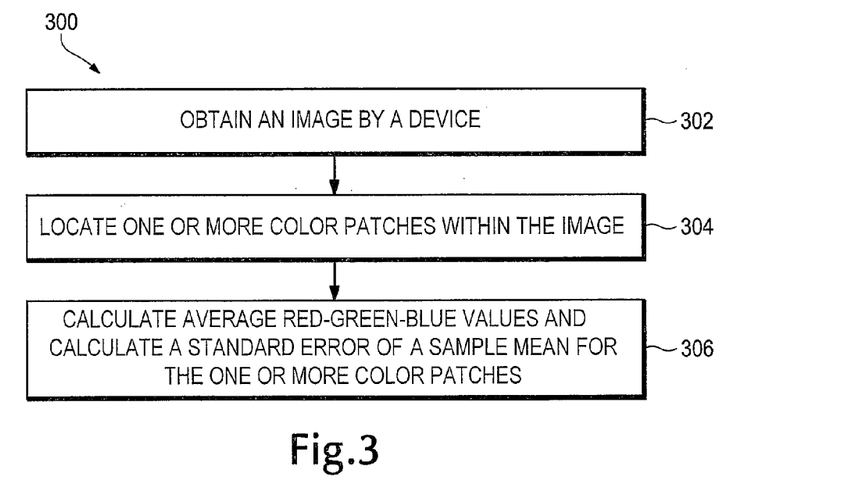
FIG. 3 is a flow diagram illustrating a procedure for obtaining a device response to known colors in accordance with one or more embodiments.

Referring to FIG. 3, a flow diagram illustrates an example procedure in accordance with one or more embodiments, although the scope of claimed subject matter is not limited in this respect. Procedure 300 illustrated in FIG. 3 may be used to determine a device response to known colors in accordance with one or more embodiments, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

Procedure 300 depicted in FIG. 3 may in alternative embodiments be implemented in software, hardware, and/or firmware, and may comprise discrete operations. As illustrated, procedure 300 may be used to determine a device response to known colors starting at block 302 where an image may be obtained via a digital imaging device 100. For example, as discussed above, the known colors may comprise an array of colored squares of a test patch card. Additionally or alternatively, images may be downsampled, such as for example, where large images may be downsampled so as to reduce size of the data of the image such as by reducing the sampling rate. At block 304, one or more color patches may be located within the image. For example, in instances where the known colors may comprise an array of colored squares of a test patch card, cross hairs may be aligned with each of the four corners of the image of the test patch card and the location of the colored squares may be calculated based on pre-set information regarding the layout of the colored squares within a particular test patch card type. At block 306, average input color values 102 may be calculated; additionally a standard error of a sample mean for the one or more color patches may be calculated. For example, if the input color values 102 are expressed in RGB (Red, Green, and Blue) source color space, average red-green-blue input color values 102 may be calculated. Accordingly, the average input color values 102 and standard error may be used to quantify the response of a device to known colors.

Figure 4:
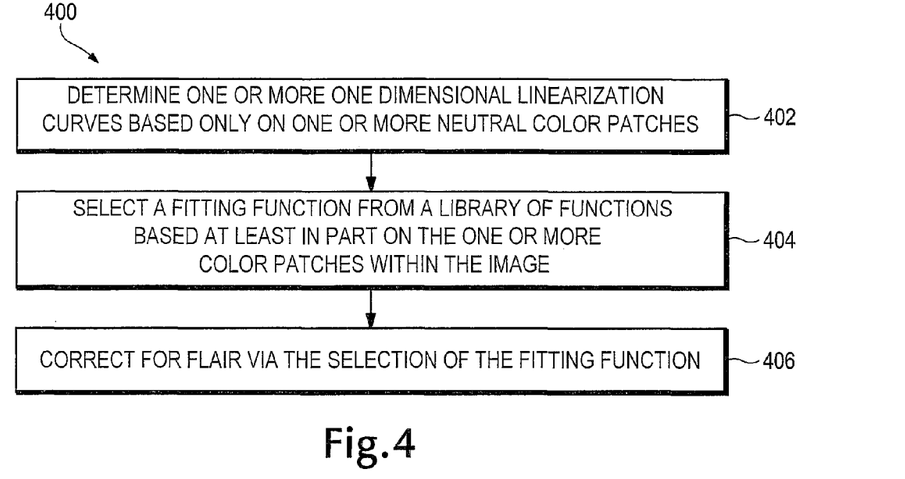
FIG. 4 is a flow diagram illustrating a procedure for determining one dimensional linearization curves in accordance with one or more embodiments.

Referring to FIG. 4, a flow diagram illustrates an example procedure in accordance with one or more embodiments, although the scope of claimed subject matter is not limited in this respect. Procedure 400 illustrated in FIG. 4 may be used to determine one dimensional linearization curves in accordance with one or more embodiments, for example, although the scope of claimed subject matter is not limited in this respect. Additionally, although procedure 400, as shown in FIG. 4, comprises one particular order of blocks, the order in which the blocks are presented does not necessarily limit claimed subject matter to any particular order. Likewise, intervening blocks shown in FIG. 4 and/or additional blocks not shown in FIG. 4 may be employed and/or blocks shown in FIG. 4 may be eliminated, without departing from the scope of claimed subject matter.

Procedure 400 depicted in FIG. 4 may in alternative embodiments be implemented in software, hardware, and/or firmware, and may comprise discrete operations. As illustrated, procedure 400 may be used to determine one dimensional linearization curves starting at block 402 where one or more one dimensional linearization curves may be determined based only on one or more neutral color patches within the image. For example, one or more estimated one dimensional linearization curves may be estimated by fitting inputs from one or more neutral color patches to reference linear data. For instance, utilizing the one or more neutral color patches, a least-squares fit may be performed to a parameterized curve for each color channel of input color values 102. At block 404, a fitting function may be selected from a library of functions based at least in part on the one or more color patches within the image. For instance, utilizing the one or more estimated one dimensional linearization curves, a function with a best fit may be selected based on a comparison between the estimated one dimensional linearization curve and a pre-defined function. Such a fitting function may be selected from a library of functions based at least in part on the estimated one dimensional linearization curve. Further, such a library of functions may comprises one or more log functions, gamma functions, linear functions with offset and gain correction, and/or the like, and/or combinations thereof. Accordingly, the selected fitting functions may be utilized as input linearization curves 112 for use in color conversion operations. At block 406, flare may be automatically corrected for via the selection of the fitting function. For example, a separate additional step of subtracting an estimated average device flare may be discarded as the selection of the fitting function may itself correct for flare. Accordingly, procedure 400 may be used to calculate linearization curves 112 so as to fit to input color values 102, remove flare, balance white, and/or to linearly scale a translation of color values to intermediate device independent color space (such as CIE XYZ color space for example).

Figure 5:
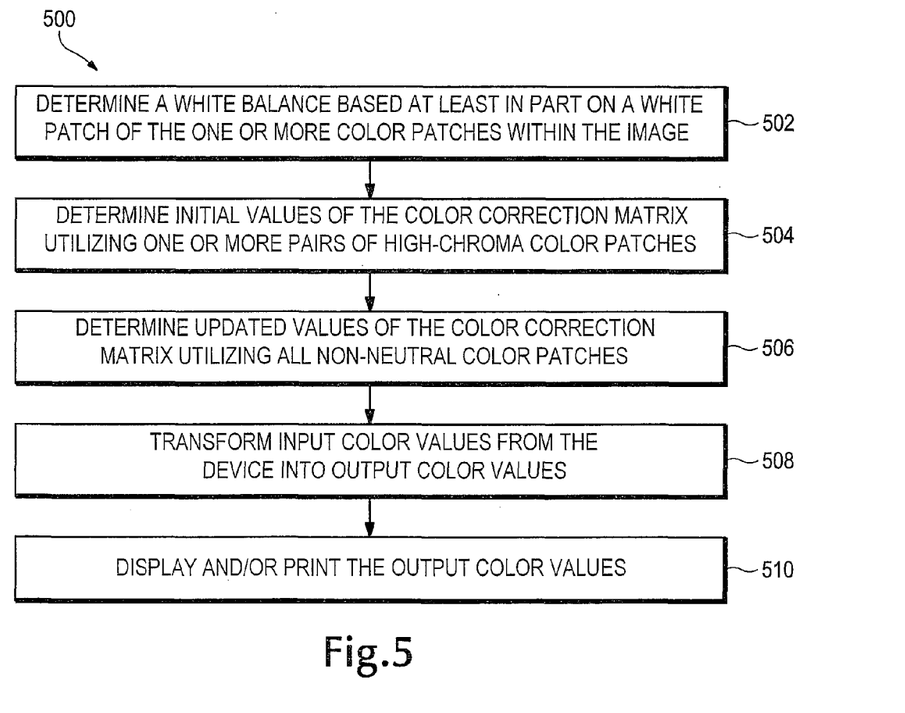
FIG. 5 is a flow diagram illustrating a procedure for determining a color correction matrix in accordance with one or more embodiments.

Referring to FIG. 5, a flow diagram illustrates an example procedure in accordance with one or more embodiments, although the scope of claimed subject matter is not limited in this respect. Procedure 500 illustrated in FIG. 5 may be used to determine a color correction matrix in accordance with one or more embodiments, for example, although the scope of claimed subject matter is not limited in this respect. Additionally, although procedure 500, as shown in FIG. 5, comprises one particular order of blocks, the order in which the blocks are presented does not necessarily limit claimed subject matter to any particular order. Likewise, intervening blocks shown in FIG. 5 and/or additional blocks not shown in FIG. 5 may be employed and/or blocks shown in FIG. 5 may be eliminated, without departing from the scope of claimed subject matter.

Procedure 500 depicted in FIG. 5 may in alternative embodiments be implemented in software, hardware, and/or firmware, and may comprise discrete operations. As illustrated, procedure 500 may be used to determine a color correction matrix starting at block 502 where a white balance may be determined. For example, white balance may be determined based at least in part on a white patch of the one or more color patches within the image. At block 504 initial values of the color correction matrix may be determined. For example, initial values of the color correction matrix may be determined based at least in part on estimating local minimum values utilizing one or more pairs of high-chroma color patches within the image. For instance, using pairs of high-chroma color patches, the color correction matrix may be tuned to minimize error, such as the maximum delta error over all the color patches, in the matrix by iterating over a number of pairs of high-chroma color patches. For each pair of high-chroma color patches used to tune the color correction matrix, initial values of the color correction matrix may be calculated to fit only the pair of high-chroma color patches as well as the white patch. A resultant initial color correction matrix may then be selected that gives the smallest maximum error, such as a smallest maximum error measured as delta error, over all the color patches. At block 506 updated values of the color correction matrix may be determined. For example, updated values of the color correction matrix may be determined utilizing all non-neutral color patches within the image. For instance, starting with the initial color correction matrix determined above, updated values of the color correction matrix may be determined by tuning the initial color correction matrix to find a local minimum for the error over all non-neutral color patches within the image. For example, a local minimum for the error over all non-neutral color patches within the image may be a mean patch error over all non-neutral patches, where the patch error may be the distance between a sample and a reference in CIE L*a*b* space (luminance, red/blue chrominance and yellow/blue chrominance with dimension L for luminance and a and b for the color-opponent dimensions), with the difference between a sample and a reference in the L* coordinate being divided by 2.

Accordingly, the updated values of the color correction matrix may be utilized as color correction matrix 120 for use in color conversion operations. At block 508 input color values 102 from the device 100 may be transformed into output color values 122. For example, input color values 102 may be transformed into output color values 122 based at least in part on the one or more one dimensional linearization curves 112 and/or the updated values of the color correction matrix 120. At block 510 the output color values 120 may be displayed and/or printed. Accordingly, procedure 500 may be used to translate linearized input color values 102 (such as RGB input color values for example) to intermediate device independent color space (such as CIE XYZ color space for example), while also minimizing a weighted error including error delta and/or maximum error.

Figure 6:
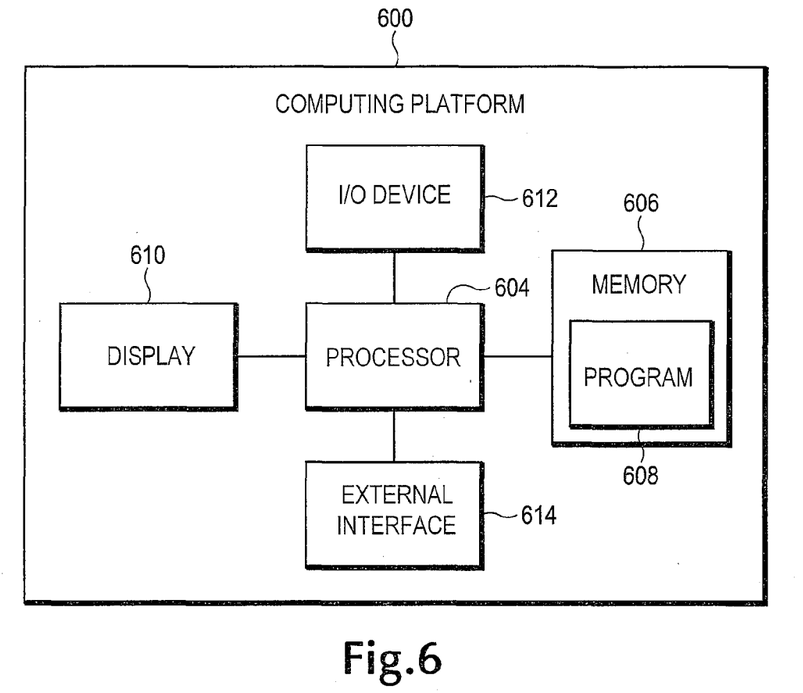
FIG. 6 is a schematic diagram of a computing platform in accordance with one or more embodiments.

Referring to FIG. 6, a block diagram illustrates a computing platform 600 according to one or more embodiments, although the scope of claimed subject matter is not limited in this respect. Computing platform 600 may include more and/or fewer components than those shown in FIG. 6. However, generally conventional components may not be shown, for example, a battery, a bus, and so on.

Computing platform 600, as shown in FIG. 6 may be utilized to tangibly embody a computer program and/or graphical user interface by providing hardware components on which the computer program and/or graphical user interface may be executed. Computing platform 600 may be utilized to tangibly embody all or a portion of procedure 200 of FIG. 2, procedure 300 of FIG. 3, procedure 400 of FIG. 4, and/or procedure 500 of FIG. 5. Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 6, computing platform 600 may be controlled by processor 604, including one or more auxiliary processors (not shown). Processor 604 may comprise a central processing unit such as a microprocessor or microcontroller for executing programs, performing data manipulations, and controlling the tasks of computing platform 600. Auxiliary processors may manage input/output, perform floating point mathematical operations, manage digital signals, perform fast execution of signal processing algorithms, operate as a back-end processor and/or a slave-type processor subordinate to processor 604, operate as an additional microprocessor and/or controller for dual and/or multiple processor systems, and/or operate as a coprocessor and/or additional processor. Such auxiliary processors may be discrete processors and/or may be arranged in the same package as processor 604, for example, in a multicore and/or multithreaded processor; however, the scope of claimed subject matter is not limited in these respects.

Communication with processor 604 may be implemented via a bus (not shown) for transferring information among the components of computing platform 600. A bus may include a data channel for facilitating information transfer between storage and other peripheral components of computing platform 600. A bus further may provide a set of signals utilized for communication with processor 604, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 600 may include, for example, memory 606, including one or more auxiliary memories (not shown). Memory 606 may provide storage of instructions and data for one or more programs 608 to be executed by processor 604, such as all or a portion of procedure 200 of FIG. 2, procedure 300 of FIG. 3, procedure 400 of FIG. 4, and/or procedure 500 of FIG. 5, for example. Memory 606 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 606 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 606 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 600 further may include a display 610. Display 610 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 610 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 600 further may include one or more I/O devices 612. I/O device 612 may comprise one or more I/O devices 612 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 600 further may include an external interface 614. External interface 614 may comprise one or more controllers and/or adapters to prove interface functions between multiple I/O devices 612. For example, external interface 614 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 612.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   determining a response of a device to known colors based at least in part on an image obtained by the device, the image comprising one or more color patches;
   determining one or more one dimensional linearization curves based at least in part on fitting values from one or more color patches within the image to reference data; and
   determining a color correction matrix, wherein said determining the color correction matrix comprises:
      determining initial values of the color correction matrix based at least in part on estimating local minimum values utilizing one or more pairs of high-chroma color patches within the image; and
      determining updated values of the color correction matrix utilizing all non-neutral color patches within the image.

2. The method of claim 1, wherein said determining one or more one dimensional linearization curves is based only on one or more neutral color patches.

3. The method of claim 1, wherein said determining a response of a device to known colors further comprises locating one or more color patches within the image.

4. The method of claim 1, wherein the known colors comprise an array of colored squares of a test patch card, and wherein the one or more color patches within the image comprise one or more neutral color patches, one or more non-neutral color patches, and two or more high-chroma color patches.

5. The method of claim 1, wherein said determining a response of a device to known colors further comprises calculating average red-green-blue values and calculating a standard error of a sample mean for the one or more color patches.

6. The method of claim 1, wherein said determining one or more one dimensional linearization curves further comprises selecting a fitting function from a library of functions based at least in part on the one or more color patches within the Image.

7. The method of claim 1, wherein said determining one or more one dimensional linearization curves further comprises:
   selecting a fitting function from a library of functions based at least in part on the one or more color patches within the image;
   automatically correcting for flare via the selection of the fitting function; and
   wherein the library of functions comprises one or more log functions, gamma functions, linear functions with offset and gain correction, and/or combinations thereof.

8. The method of claim 1, wherein said determining a color correction matrix further comprises: determining a white balance based at least in part on a white patch of the one or more color patches within the image.

9. The method of claim 1, further comprising:
transforming input color values from the device into output color values based at least in part on the one or more one dimensional linearization curves and the color correction matrix; and
displaying and/or printing the output color values.

10. An article, comprising:
a non-transitory storage medium comprising machine-readable instructions stored thereon which, if executed by a computing platform, result in:
determining a response of a device to known colors based at least in part on an image obtained by the device, the image comprising one or more color patches;
determining one or more one dimensional linearization curves based at least in part on fitting values from one or more color patches within the image to reference data; and
determining a color correction matrix, wherein said determining the color correction matrix comprises:
determining initial values of the color correction matrix based at least in part on estimating local minimum values utilizing one or more pairs of high-chroma color patches within the image; and
determining updated values of the color correction matrix utilizing all non-neutral color patches within the image.

11. The article of claim 10, wherein said determining one or more one dimensional linearization curves is based only on one or more neutral color patches.

12. The article of claim 10, wherein said determining one or more one dimensional linearization curves further comprises:
selecting a fitting function from a library of functions based at least in part on the one or more color patches within the image;
automatically correcting for flare via the selection of the fitting function; and
wherein the library of functions comprises one or more log functions, gamma functions, linear functions with offset and gain correction, and/or combinations thereof.

13. The article of claim 10, wherein said determining a color correction matrix further comprises:
determining a white balance based at least in part on a white patch of the one or more color patches within the image.

14. The article of claim 10, wherein said machine-readable instructions, if executed by a computing platform, further result in:
transforming input color values from the device into output color values based at least in part on the one or more one dimensional linearization curves and the color correction matrix; and
displaying and/or printing the output color values.

15. An apparatus, comprising:
a computing platform, said computing platform comprising:
a processor system, said processor system being capable of:
determining a response of a device to known colors based at least in part on an image obtained by the device, the image comprising one or more color patches;
determining one or more one dimensional linearization curves based at least in part on fitting values from one or more color patches within the image to reference data; and
determining a color correction matrix, wherein said determining the color correction matrix comprises:
determining initial values of the color correction matrix based at least in part on estimating local minimum values utilizing one or more pairs of high-chroma color patches within the image; and
determining updated values of the color correction matrix utilizing all non-neutral color patches within the image.

16. The apparatus of claim 15, wherein said determining one or more one dimensional linearization curves is based only on one or more neutral color patches.

17. The apparatus of claim 15, wherein said determining one or more one dimensional linearization curves further comprises:
selecting a fitting function from a library of functions based at least in part on the one or more color patches within the image;
automatically correcting for flare via the selection of the fitting function; and
wherein the library of functions comprises one or more log functions, gamma functions, linear functions with offset and gain correction, and/or combinations thereof.

18. The apparatus of claim 15, wherein said determining a color correction matrix further comprises:
determining a white balance based at least in part on a white patch of the one or more color patches within the image.

19. The apparatus of claim 15, wherein said processor system is further capable of:
transforming input color values from the device into output color values based at least in part on the one or more one dimensional linearization curves and the color correction matrix; and
displaying and/or printing the output color values.

20. A non-transitory computer-readable storage medium storing program instructions, wherein the program instructions are computer-executable to implement:
determining a response of a device to known colors based at least in part on an image obtained by the device, the image comprising one or more color patches;
determining one or more one dimensional linearization curves based at least in part on fitting values from one or more color patches within the image to reference data; and
determining a color correction matrix based at least in part on estimating local minimum values utilizing one or more pairs of high-chroma color patches within the image;
wherein the known colors comprise an array of colored squares of a test patch card, and wherein the one or more color patches within the image comprise one or more neutral color patches, one or more non-neutral color patches, and two or more high-chroma color patches.

21. The non-transitory computer-readable storage medium of claim 20, wherein said determining one or more one dimensional linearization curves is based only on one or more neutral color patches.

22. The non-transitory computer-readable storage medium of claim 20, wherein to perform said determining a response of a device to known colors, the program instructions are further computer-executable to implement locating one or more color patches within the image.

23. The non-transitory computer-readable storage medium of claim 20, wherein to perform said determining one or more one dimensional linearization curves, the program instructions are further computer-executable to implement selecting a fitting function from a library of functions based at least in part on the one or more color patches within the Image.

24. The non-transitory computer-readable storage medium of claim 20, to perform said determining one or more one dimensional linearization curves, the program instructions are further computer-executable to implement:

selecting a fitting function from a library of functions based at least in part on the one or more color patches within the image;

automatically correcting for flare via the selection of the fitting function; and wherein the library of functions comprises one or more log functions, gamma functions, linear functions with offset and gain correction, and/or combinations thereof.

* * * * *